US010235759B2

United States Patent
Kosmecki et al.

(10) Patent No.: US 10,235,759 B2
(45) Date of Patent: Mar. 19, 2019

(54) METHOD FOR CELL ENVELOPE SEGMENTATION AND VISUALISATION

(71) Applicant: Scopis GmbH, Berlin (DE)

(72) Inventors: Bartosz Kosmecki, Berlin (DE); Christopher Oezbek, Berlin (DE); Christian Winne, Berlin (DE)

(73) Assignee: Scopis GmbH, Berlin (DE)

( * ) Notice: Subject to any disclaimer, the term of this patent is extended or adjusted under 35 U.S.C. 154(b) by 29 days.

(21) Appl. No.: 15/300,414

(22) PCT Filed: Apr. 1, 2015

(86) PCT No.: PCT/EP2015/057162
§ 371 (c)(1),
(2) Date: Nov. 1, 2016

(87) PCT Pub. No.: WO2015/150444
PCT Pub. Date: Oct. 8, 2015

(65) Prior Publication Data
US 2017/0148173 A1    May 25, 2017

(30) Foreign Application Priority Data

Apr. 1, 2014 (GB) ..................................... 1405820

(51) Int. Cl.
*G06K 9/00* (2006.01)
*G06T 7/12* (2017.01)
(Continued)

(52) U.S. Cl.
CPC ............. *G06T 7/12* (2017.01); *G06T 7/0012* (2013.01); *G06T 7/149* (2017.01); *G06T 19/006* (2013.01);
(Continued)

(58) Field of Classification Search
CPC ......... G06T 7/12; G06T 7/149; G06T 7/0012; G06T 7/593; G06T 19/006;
(Continued)

(56) References Cited

U.S. PATENT DOCUMENTS 6,190,395 B1    2/2001    Williams
6,301,495 B1    10/2001   Gueziec et al.
(Continued)

FOREIGN PATENT DOCUMENTS

EP            1941449 B1    7/2012
WO        2008/021702 A2    2/2008
(Continued)

OTHER PUBLICATIONS

Burschka et al., "Scale-invariant registration of monocular endoscopic images to CT-scans for sinus surgery", Medical Image Analysis 9, May 2005, pp. 413-426.*
(Continued)

*Primary Examiner* — Jose L Couso
(74) *Attorney, Agent, or Firm* — Howard & Howard Attorneys PLLC

(57) ABSTRACT

The present invention relates to a method for the segmentation and visualization of cell envelopes. A method is provided for the segmentation and visualization of cavities or orifices of the human body, comprising the steps of manual pre-segmentation of cells by defining enclosing geometric primitives in a 3D patient image for generating initial cell envelopes; analysing the cell anatomy within pre-segmented geometric primitives; using the result of the analysis for adjustment of the cell envelope and visualising the cell envelopes.

20 Claims, 8 Drawing Sheets

(51) Int. Cl.
    *G06T 7/149*     (2017.01)
    *G06T 7/00*      (2017.01)
    *G06T 19/00*     (2011.01)
(52) U.S. Cl.
    CPC ........... *G06T 2207/10068* (2013.01); *G06T 2207/10081* (2013.01); *G06T 2207/20104* (2013.01); *G06T 2207/30004* (2013.01)
(58) Field of Classification Search
    CPC . G06T 2207/10068; G06T 2207/20104; G06T 2207/30004; G06T 2207/10021; G06T 2207/20108; G06T 2207/10072–2207/10081; G06T 2207/10101; G06T 15/00; G06T 15/08; G06T 17/00; G06T 17/10; G06T 2200/04; G06T 2210/41; G06F 19/30; G06F 19/32; G06F 19/321; G06F 19/34; Y10S 600/921; G06K 9/0014; A61B 17/00; A61B 17/24; A61B 34/00; A61B 34/10; A61B 34/20; A61B 90/37; A61B 2034/101; A61B 2034/107; A61B 1/233; A61B 5/6819; A61B 1/00009; A61B 2090/367
    See application file for complete search history.

(56) References Cited

U.S. PATENT DOCUMENTS

| | | | |
|---|---|---|---|
| 6,466,815 | B1 | 10/2002 | Saito et al. |
| 6,850,794 | B2 | 2/2005 | Shahidi |
| 7,379,077 | B2 | 5/2008 | Bani-Hashemi et al. |
| 7,605,826 | B2 | 10/2009 | Sauer |
| 7,844,320 | B2 | 11/2010 | Shahidi |
| 7,993,353 | B2 | 8/2011 | Roeβner et al. |
| 7,995,076 | B2 | 8/2011 | Emam et al. |
| 8,126,223 | B2 | 2/2012 | Coste-Maniere et al. |
| 9,330,490 | B2 * | 5/2016 | Weersink ............ G06T 15/20 |
| 9,641,808 | B2 | 5/2017 | Rose et al. |
| 9,646,423 | B1 | 5/2017 | Sun et al. |
| 9,974,503 | B2 * | 5/2018 | Schildkraut .......... A61B 6/5217 |
| 2007/0282305 | A1 * | 12/2007 | Goldfarb ............. A61B 1/0014 604/528 |
| 2008/0071142 | A1 | 3/2008 | Gattani et al. |
| 2008/0207997 | A1 * | 8/2008 | Higgins ............. A61B 1/00009 600/114 |
| 2008/0310716 | A1 * | 12/2008 | Jolly ..................... G06K 9/342 382/173 |
| 2009/0080737 | A1 * | 3/2009 | Battle ............... A61M 25/0662 382/131 |
| 2009/0128553 | A1 * | 5/2009 | Perry ..................... G06T 19/00 345/419 |
| 2010/0295931 | A1 | 11/2010 | Schmidt |
| 2012/0280988 | A1 | 11/2012 | Lampotang et al. |
| 2013/0022255 | A1 | 1/2013 | Chen et al. |
| 2013/0245460 | A1 | 9/2013 | King et al. |
| 2014/0193056 | A1 | 7/2014 | Neff |
| 2014/0275975 | A1 | 9/2014 | Coste-Maniere et al. |
| 2014/0330115 | A1 * | 11/2014 | Schildkraut .......... A61B 6/5217 600/425 |
| 2015/0062299 | A1 * | 3/2015 | Brown ............... H04N 13/0239 348/45 |
| 2016/0008083 | A1 * | 1/2016 | Kesten ................. A61B 5/062 600/424 |
| 2016/0120609 | A1 | 5/2016 | Jacobsen et al. |
| 2016/0270863 | A1 | 9/2016 | Makower |
| 2016/0360117 | A1 | 12/2016 | Elefteriu et al. |
| 2017/0007350 | A1 | 1/2017 | Popovic et al. |
| 2017/0231714 | A1 * | 8/2017 | Kosmecki ............ A61B 90/37 345/419 |

FOREIGN PATENT DOCUMENTS

| | | |
|---|---|---|
| WO | 2009/120196 A1 | 10/2009 |
| WO | 2013/012966 A1 | 1/2013 |
| WO | 2013/012492 A2 | 7/2013 |

OTHER PUBLICATIONS

Yamashita et al., "Real-Time 3-D Model-Based Navigation System for Endoscopic Paranasal Sinus Surgery", IEEE Transactions on Biomedical Engineering, vol. 46, No. 1, Jan. 1999, pp. 107-116.*
Chen et al., "Navigating System for Endoscopic Sinus Surgery Based on Augmented Reality", 2007 IEEE/ICME International Conference on Complex Medical Engineering, 2007, pp. 185-188.*
Appelt et al., "Image Analysis and Visualization for Planning of Paranasal Sinus Operations", Translation of German Publication submitted by Appliant on Sep. 30, 2016, translation—Feb. 2018, pp. 1-10.*
Zein et al., "A Fast and Accurate Approach for the Segmentation of the Paranasal Sinus," 2005 Bildverarbeitung für die Medizin 2005 (pp. 93-97).
Lo, P., & de Bruijne, "Voxel classification based airway tree segmentation," SPIE 6914, Medical Imaging 2008: Image Processing, 69141K (Mar. 11, 2008).
Tingelhoff et al., "Comparison between manual and semi-automatic segmentation of nasal cavity and paranasal sinuses from CT images," 2007, Proceedings of the 29th Annual International Conference of the IEEE EMBS (pp. 5505-5508).
Moral et al., "3D Endoscopic Approach for Endonasal Sinus Surgery," 2007 Proceedings of the 29th Annual International Conference of the IEEE EMBS, pp. 4683-4686.
Pappas, "An adaptive clustering algorithm for image segmentation," 1992, IEEE Transactions on Signal Processing, 40 (4).
Manfred Hinz, et al., "Region-based interactive 3D image analysis of structures in medical data by hybrid rendering," Proceedings of SPIE, vol. 4681, May 16, 20012, pp. 388-395.
Remi Cuingnet, et al., "Automatic Detection and Segmentation of Kidneys in 3D CT Images Using Random Forests," Medical Image Computing and Computer-Assisted Intervention MICCAI 2012, pp. 66-74 (Oct. 1, 2012).
Yapp, et al., "Quantitative Analsys and Visualization with 3D Slicer," Jan. 1, 2011.
D. Apelt, et al., "Bildanalyse und Visualisierung fuer die Planung von Nasennebenhoehlen-Operationen," Bildverarbeitung fuer die Medizin 2004, pp. 194-198.
Joachim Kettenbach et al., "Virtual Endoscopy of the Paranasal Sinuses," Image Processing in Radiology, Jan. 1, 2008, pp. 151-171.
Baumhauer, M. et al., "Navigation in Endoscopic Soft Tissue Surgery—Perspectives and Limitations", Journal of Endourology, vol. 27, Issue 4, Apr. 17, 2008, pp. 1-15.
Caversaccio, M.D., Marco et al., "Computer-Assistance for Intraoperative Navigation in ENT Surgery", Minimally Invasive Therapy & Allied Technologies, vol. 12, Issue 1-2, 2003, pp. 1-40.
Freysinger, W. et al., "Image-Guided Endoscopic ENT Surgery", Eur Arch Otorhinolaryngol, vol. 254, 1997, pp. 343-346.
Wormald, Peter-John, "Surgery for the Frontal Recess and Frontal Sinus", Rhinology, vol. 43, 2005, pp. 82-85.
Shahidi, Ramin et al., "Implementation, Calibration and Accuracy Testing of an Image-Enhanced Endoscopy System", IEEE Transations on Medical Imaging, vol. 21, No. 12, Dec. 2002, pp. 1524-1535.
Sielhorst, Tobias et al., "Advanced Medical Displays: a Literature Review of Augmented Reality", Journal of Display Technology, vol. 4, No. 4, Dec. 2008, pp. 451-467.
Winne, Ch. et al., "Overlay Visualization in Endoscopic ENT Surgery", Int. J. CARS, vol. 5 (Suppl 1), 2010, pp. S269-S270.
Wormald, M.D., Peter-John, "Three-Dimensional Building Block Approach to Understanding the Anatomy of the Frontal Recess and Frontal Sinus", Operative Techniques in Otolaryngology, vol. 17, 2006, pp. 2-5.

* cited by examiner

METHOD FOR CELL ENVELOPE SEGMENTATION AND VISUALISATION

CROSS-REFERENCE TO RELATED APPLICATIONS

The present application is a national stage application of PCT/EP2015/057162 filed on Apr. 1, 2015 and published as WO 2015/150444 on Oct. 8, 2015 claiming priority of British Patent Application No. GB 1405820.8 filed on Apr. 1, 2014. The aforementioned applications are hereby incorporated by reference in its entirety.

BACKGROUND OF THE INVENTION

Field of the Invention

The present invention relates to a method for the segmentation and visualization of cell envelopes.

Brief Description of the Related Art

Physicians use during surgical planning a simplified planning scheme, wherein the cells or cavities of the nose are painted on paper to achieve better orientation in the complex anatomy of the sinuses. In such planning scheme simple three-dimensional geometric primitives are used to define the position and size of nasal cavities. Such a scheme supports the physician to transfer acquired generalized medical knowledge to the current situation in a patient and to detect the relevant anatomical structures and classify their geometric position. Such acute knowledge about the patient at hand is crucial to perform surgical interventions to achieve results within the medical state of the art.

In the literature, there are approaches to support the clinician by automatic and semi-automatic segmentation methods of the nasal anatomy during surgical planning. Here, the aim is to detect and identify the cavities of the nose in order to find or define the optimal access path to the surgical region of interest (ROI).

Zein and colleagues described 3-D region growing segmentation (Zein et al., 2005 Bildverarbeitung fur die Medizin 2005 (pp. 93-97). The description discloses a contrast enhancement of 3-D image data and edge-preserving smooth filtering, a 3D region growing starting at seed voxels, which fulfil intensity threshold criterion followed by a post-processing of segmentation to reject areas not belonging to the nasal system by detecting leakage regions. The results are used for a 3D view of air space of paranasal sinuses and virtual endoscopy Disadvantages related to the method disclosed by Zein et al are that the method only works with air-filled nasal cells. Further, it does not provide a differentiation and subdivision of individual nasal cells.

Lo and de Bruijne described a voxel classification based airway tree segmentation (Lo, P., & de Bruijne, M. 2008, Proc. SPIE). They described a 3D region growing starting with main bronchus as seed point. They define with $K^{th}$ nearest neighbor (KNN) a local criterion using the following image descriptors instead of using only image gray value: convolution with Gaussian, 1st and 2nd order derivates, gradient magnitude, Eigenvalues of Hessian, Laplacian, Gaussian curvature, Eigen magnitude, Ratios of eigenvalues.

It is disadvantageous that the method disclosed by Lo and de Bruijne is only applicable for segments air-filled cavities and adjusted for use to segment airways in the lung.

Tingelhoff and colleagues disclose a comparison between the manual and semi-automatic segmentation of nasal cavity and paranasal sinuses from CT images (Tingelhoff et al., 2007, Proceedings of the 29th Annual International Conference of the IEEE EMBS (pp. 5505-5508). This document discloses a 3D region growing segmentation using AMIRA 4.1 software (Mercury Inc., now: Visage Imaging Inc.). It is disadvantageous that only segmentation of connected cavities is possible and a manual definition of seed points for region growing algorithm is necessary.

Moral and colleagues disclose a 3D region growing segmentation using AMIRA 4.1 software for planning of a path from nostrils to maxillary sinuses, sphenoidal sinuses, ethoidal sinuses and frontal sinuses (Moral et al. 2007 Proceedings of the 29th Annual International Conference of the IEEE EMBS, pp. 4683-4686). The disadvantages are same as mentioned above for the publication of Tingelhoff et al., namely that only segmentation of connected cavities is possible and a manual definition of seed points for region growing algorithm is necessary.

Document WO 2013/012492 A2 discloses a method for displaying a paranasal sinus region of a patient, comprising acquiring volume image data of the paranasal sinus region of the patient, identifying one or more airways within the paranasal sinus region from the volume image data, displaying the at least one or more airways and highlighting one or more portions of the displayed one or more airways that are constricted below a predetermined value.

This document relates to CT/Cone-Beam imaging, adaptive segmentation based on the disclosure of Pappas (Pappas, 1992, IEEE Transactions on Signal Processing, 40(4)), K-means classification (clustering) of segmented region based on their mean gray values (e.g. 4 clusters), voxel assignment to a cluster, external air removal using morphological operators on tissue maps/clusters and user interaction for modification of the result of the automatic segmentation, as can be taken from FIG. 4. This figure shows an added user input step 405 allowing the user to provide input that improves automatic segmentation, including edits to the class map, for example. In step 405, the user further provides instructions that modify the display of anatomy of the nasal region in some way. The modifications can be indicated interactively by viewer instructions entered with reference to a displayed rendering of CT slices in a coronal, axial, sagittal, or other view. The user input instructions can be entered using a pointer device, such as a computer mouse or joystick, for example, or using a touch screen as input device. Alternatively, the user may interact with the system using a 3D rendering of the nasal region. For example, in step 405 the user may enter instructions that indicate that an ostium of the left maxillary sinus is blocked. The indication that a ostium is blocked will cause a specific colour to display that cells may change. It is possible that the user removes sinus cells, bone and other tissue from the display, to skeletonize airways (compute medial lines within objects), compute cross-sectional views along the skeletons (perpendicular to path) and highlight important locations (e.g. locations of global or local minimum cross-sectional area that may occur at sinus ostia or locations at which a drainage path is restricted, or points with high curvature).

The method disclosed in WO 2013/012492 A2 allows a virtual endoscopic view, provides a path finding algorithm and the registration of segmentation to a labelled atlas based on statistical data so that the anatomy is identified. Alternatively manual anatomy identification or labelling by the user (using lists, audible prompt) is possible. An atlas with irregularities helps to identify different anatomical variations (e.g. agger nasi cell). Cell properties can be displayed (volume (natural and air), location, presence of polyps or infections) and simplified graphical representation of anatomical structures based on segmentation results can be generated. This document discloses a system to execute segmentation and display of paranasal cavities A disadvantage of the method disclosed in WO 2013/012492 A2 is the difficulty for the user to prove the results of automatic segmentation and optimize it, especially to separate connected cells. The method does not allow to separate connected cells, a corresponding description is missing. In addition, there is no description how to segment blocked ostia.

WO 2009/120196A1 discloses a method of and a system for a 3D workstation for security and medical applications. A rendering method of volumetric data is described, including highlighting detected regions using the contour of the object on 2D displays and 3D stereoscopic displays. The contour colours are differently from rendering the volumetric data without highlighting. This document describes only the highlighting of a marked region in 2-D or 3-D views, but no description how the regions are detected is provided.

EP 1941449 B1 discloses a method for rendering a surface indicative of an interior of a colon. The method comprises using volumetric data (202) indicative of the interior anatomy of a human colon to render a surface (102) indicative of an interior of the colon. The method is characterized by the steps of identifying a region of the rendered surface, which is suspected to include residual stool, and highlighting the identified region (104) on an image of the rendered surface (102). The contour of the region of interest (ROI) is highlighted in virtual endoscopic view. This document discloses only a rendering method related to the colon.

Document WO 2008/021702 A2 discloses a method of quantifying a sinus condition of at least one sinus cavity of a patient. The method comprises the steps of generating an image of the patient, locating the at least one sinus cavity in the image and quantifying the sinus condition of the at least one sinus cavity based on the image, the automatic density-based detection and location of sinus cavities, a manual identification of sinus cavities by a technician and quantification of the amount of fluid or polys in a sinus cavity to determine the sinus condition or progress of sinus condition. WO 2008/021702 A2 does not provide the implementation of the manual or automatic segmentation of sinus cavities The documents WO2013/012966A1 and US2013/0022255A1 describe a method for segmenting a feature of interest from a volume image which segments image data elements of a subject. One or more boundary points along a boundary of the feature of interest are identified according to one or more geometric primitives defined by a user. A foreground seed curve is defined according manually identified boundary points and a background seed curve encompassing and spaced apart from the foreground seed curve is formed. Segmentation is applied to the volume image according to foreground values that are spatially bounded within the foreground seed curve and according to background values that lie outside the background seed curve. This method comprises a manual segmentation step to segment boundary points of a feature of interest in dental images as a first step, but also requires afterwards further manual input of the user for defining the foreground and background seed curves in order to distinguish the feature from the surroundings.

Document US2008/0310716A1 discloses a method for improving an existing segmentation of an object in images which includes the steps of drawing a contour on a previous (pre-)segmentation of an object in image data, generating at least one seed point on the pre-segmentation from an intersection of the contour and the pre-segmentation, providing a weighting factor between the seed points and the pre-segmentation, and segmenting the pre-segmentation using the seed points and the weighting factor to generate a new pre-segmentation. However, the objective of this method is an improvement of an existing segmentation, wherein the distinction between the foreground and background is determined on the basis of contours which are manually painted in the 2-D images. An automatic adjustment of the pre-segmentation especially of cell or cavities is not described.

In summary, the existing planning methods and systems provide some approaches for automatic segmentation of mainly air-filled sinuses cavities. The automatic segmentation methods, e.g. 3D region growing or 3D adaptive segmentation with k-means clustering, work well with air-filled sinus cavities. The challenge in the planning of sinus surgery, however, lies rather in a separation and identification of individual cells in particular under the absence of air. Existing methods for segmenting anatomical features in volume data based on a distinction of foreground and background using seed points require an additional manual input of the user after defining a sub-volume of interest or a previous segmentation.

In case of diseases such as inflammation of the sinuses or polyps, single or multiple cells are filled with tissue or fluid and the automatic segmentation methods are likely to fail due to marginal grey value differences of some cartilaginous cell walls and mucosa or pathological cell filling. Also the identification and labelling of separated cavities is an unsolved problem especially in the case of pathological anatomy. Also the different quality of the 3D image data is often a problem for automatic methods, which require a high resolution of the volume image data and a normalized, or uniform grey scale density map in order to guarantee satisfying results. Especially image data from older devices and Cone beam computed tomography (CBCT) often do not meet these conditions.

Systems known from the state of the art do not provide support for a planning scheme based on patient-specific 3D image data of the human body, particularly of the paranasal sinuses. Therefore, up to date the planning scheme can only be manually performed on paper with the following disadvantages:

Spatial incorrectness

Error-prone scaling/size assignment

Used cuboids or cylinders describe the shape of the cells sometimes inadequately Insufficient applicability to the surgical intervention Thus, there is a need for a computer-assisted method for fast and easy-to-use segmentation of the relevant nasal cells during the surgical planning according to simplified planning schemes. The results of the planning are intended to be in such a format that they also can be used and visualized intra-operatively by surgical assistance technology such as a surgical navigation system.

BRIEF DESCRIPTION OF THE INVENTION

The present invention provides a method for the segmentation and visualization of cavities or orifices of the human body, comprising the steps of manual pre-segmentation of cells by defining enclosing geometric primitives in a 3D patient image for generating initial cell envelopes; analysing the cell anatomy within pre-segmented geometric primitives; using the result of the analysis for adjustment of the cell envelopes; and visualising the cell envelopes.

The step of identifying cells can be based on manual input or automatic detection and it is intended that the content of the segmented areas, its vicinity and the connecting space based on the 3-D image of the human body is analysed to identify the anatomical shapes of the cells, cavities, orifices or drainage paths.

The geometric primitive can be selected from a group comprising a cuboid, sphere, cylinder and ellipse without being limited to those forms.

It is further intended that the shape of the cell can be defined by the affiliation of the voxel of the image data to the cell, wherein it is decided for each voxel whether the voxel either belongs completely to the cell, not at all to the cell or, if applicable, partially to the cell.

The properties of cells may be determined and displayed to the user such as the cell volume, filling, disease status, drainage pathway and orifices.

It is envisaged that the natural drainage pathways between segmented cells can be determined using pathfinding algorithms based on 3D image data.

The results of the segmentation of individual cells and its orifices and drainage pathways may be used in a global cell analysis to determine cell linkage and/or to calculate a recommend surgical pathway.

It is further intended that the adjustment of a visualised cell envelope can be based on analysed cell anatomy using computed voxel affiliations and the adjustment of a visualised cell envelope may be achieved by computing a surface mesh of the voxels which are affiliated completely and/or partially to the cell. Further, the adjustment of a visualised cell envelope may be achieved by optimising type, orientation, position and/or size of the enclosing geometric primitive.

The manual pre-segmentation of a cell may be done in a user-selected slice image of the 3D image data of a patient with generation of an initial three-dimensional primitive. Further, the results of the manual pre-segmentation and/or the adjusted cell envelope may be visualised pre- or intra-operatively in slice or 3D views, in a virtual endoscopic view or intra-operatively in an augmented-reality-views.

Another object of the present invention is the use of a method as described above for the generation of planning objects suitable for surgical assistance.

BRIEF DESCRIPTION OF THE FIGURES

The present invention will be described by figures and examples. It is obvious for a person ordinary skilled in the art that the scope of the invention is not limited to the disclosed embodiments. It shows.

DETAILED DESCRIPTION OF THE INVENTION

The present invention provides a fast, easy-to-use and intuitive planning method for natural cavities and orifices. The method is based on a manual segmentation method with the ability to label sinus cavities in the 3-D patient image data according to the planning scheme described in the literature and taught in the training of surgeons.

An input device within the meaning of the present invention comprises any peripheral equipment used to provide data and control signals to an information processing system such as a computer or other information appliance. A computer mouse or a touch-screen are examples of an input device according to the present invention.

Using the manual segmentation, the invention provides a method being capable of performing an automated improvement and analysis of the manual segmentation leading to a surprisingly better adjustment of the cell envelope, identification of natural drainage pathways and generates an improved input for the automatic optimization of the cavity visualization based on the 3-D image data of the patient.

The invention describes a method for the segmentation, labelling, identification and visualization of sinus cells for the planning of paranasal sinus surgery by marking manually geometric primitives within slice images of 3-D image data for the segmentation of nasal cavities and their automatic optimization based on the 3-D image data.

Figures 2, 3:
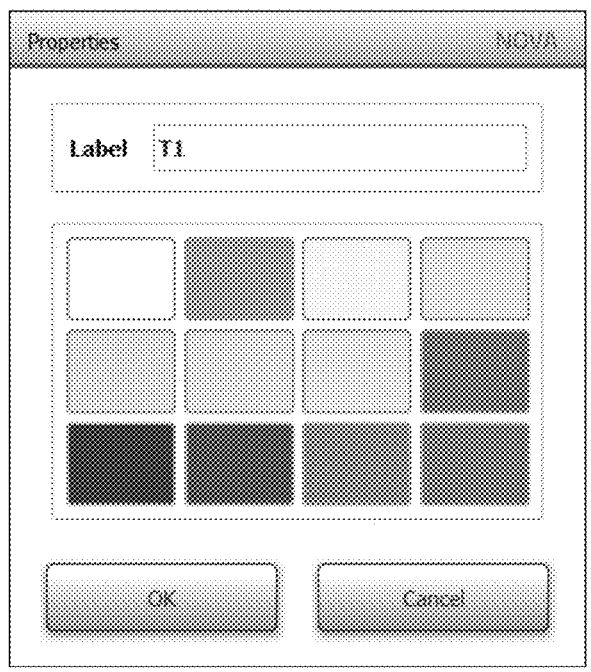
FIG. 2 User interaction widget for the selection of the type of geometric primitive with additional selection of anatomical cell FIG. 3 User interaction widget for labelling and colour selection for a cell in the form of a dialog window FIG. 4 Sequence of manual pre-segmentation of geometric primitives FIG. 5 Visualization of two pre-segmented cells using cuboids in a slice image of the 3D image data of the patient. The visualization in the slice images is realized in the form of an overlay of a cross-sectional view of the cuboids in the plane of the slice image FIG. 6 Additional marking of the adjusted cell envelope during planning. During the intraoperative visualization, the silhouette of the pre-segmented cuboids could be hide FIG. 7 Visualization of the segmentation of two cells in the form of cuboids in a 3D view FIG. 8 Visualization of the a cubic pre-segmentation of the cell and the corresponding adjusted cell envelope in a 3D view FIG. 9 Augmented reality visualization of the cell segmentation result as a superimposition in the correct spatial position in the endoscopic image

The procedure of segmenting sinus cells can be divided into the following main steps:
  a. Manual pre-segmentation of cells in the sinuses by defining enclosing geometric primitives
  b. Identification of cells based on manual input or automatic detection
  c. Analysis of the contents of the segmented areas and the connecting space based on the 3-D image data of the patient
  d. Adjustment of the properties and visualization of the cell envelope.
  e. Generation of planning objects suitable for surgical assistance The process for segmenting a cell is as follows:

In a first step, Manual or automatic selection of the type of the geometric primitive for manual marking of sinus cell. If applicable, only one method can be offered or pre-selected. One possible implementation is shown in FIG. 2. Here, the user can identify the cell that should be segmented from a list. Depending on the cell type, a type of geometric primitive is pre-selected but can be changed by the user.

If the identification to an anatomical cell is not performed in this step, it may be subsequently assigned. FIG. 3 displays a dialog box for assigning a textual label and a colour to a segmented cell. The input or assignment of a label can be done by textual input using a keyboard/screen keyboard or by voice. Alternatively, predefined labels selected from a list and a selected cell to be assigned. The colour can be chosen for example from a group of predefined colours or be set in a special colour selection dialog box in which any colour can be selected.

In a second step, a slice image of the 3-D image data is selected, which shows the cell to be selected. The orientation of the slice image can be chosen, preferably axial, coronal or sagittal, but a free orientation is also possible. Usually it makes sense to choose a slice image, which intersects the cell centre.

The following step of an initial definition of the geometric shape by user interaction in the selected slice image, comprises the steps of:
a. User interaction in case of a cuboid: Define the cell in the slice view by clicking opposite vertices or "raising" of the rectangle. The sequence of user interaction using an input device such as a computer mouse can be in case of "raising" of a rectangle as follows:
  i. Pressing the computer mouse button at any position (x1, y1) in the selected slice image
  ii. Moving the computer mouse with a pressed button to a second position (x2, y2) in the selected slice image
  iii. Releasing the computer mouse button When the rectangle is defined for the first time, a depth for the cuboid must be assigned. In the simplest case, a depth of 0 can be set. Alternatively, the depth d of the cuboid can be calculated by evaluating the initial height h and width w of the rectangle in the average image with w=(x2−x1) and h=(y2−y1):

$$d = \sqrt{\frac{w^2 + h^2}{2}}$$

or $$d = \frac{\|w\| + \|h\|}{2}$$

The box is positioned relative to the slice image such that that the selected slice image bisects the cuboid in depth.
b. User interaction in case of a sphere: Using an input device by pressing the computer mouse button at the position of the sphere centre and then "raising" the sphere. The sequence of user interaction can be implemented as follows:
  i. Pressing the computer mouse button at any position (xc, yc) in the selected slice image
  ii. Moving the computer mouse to a second position (x2, y2) in the selected slice image
  iii. Releasing the computer mouse button The position and size of the sphere is obtained by the centre (xc, yc) and the radius r of the sphere with $$r = \sqrt{(xc-x2)^2 + (yc-y2)^2}$$

c. User interaction in case of a ellipsoid: The definition of the initial position and size of the ellipsoid can be done in two ways:
  i. In analogy to cuboid definition (e.g. raising from corner to corner), except that an ellipse instead of a rectangle is visualized in the slice image. The ellipse is obtained from the two corner points (x1, y1) and (x2, y2) as follows:
    Centre of the ellipse corresponds to the centre of the rectangle
    Vertices of the ellipse are located on the rectangle boundary
    Direction of the major axis of the ellipse corresponds to the direction of the longer rectangle side
  ii. In analogy to sphere definition: Clicking on slice image to define the centre point and raise the ellipse by moving the computer mouse while keeping the mouse button pressed. The size of the ellipse is chosen so that the major and minor axes of the ellipse are aligned horizontally or vertically to the slice image and that the collected positions are located within the ellipse.

The calculation of the depth of the ellipsoid can be made equivalent to the depth calculation of the box.
d. User interaction in case of a cylinder: The definition of the base of the cylinder can be done in the selected slice image. User interaction can be carried out in analogy to the definition of a sphere. The initial height h of the cylinder can, for example, dependent are determined by the radius r of the defined surface area. Here as advantageous to determining h=2*r has been established.

In the final step of segmenting a cell, the adjustment of the position and size of geometric primitives is carried out by shifting corner points or centre points or edges in any slice images of the 3D image data carry out size of geometric primitives. Here, the sectional contour of the currently defined geometry and the currently selected image slice is calculated in each case.

Clicking and dragging the section contour or the area inside the contour can change the size or the position of the geometric primitives. In the case of cuboids, clicking and dragging vertices or edges of the rectangle, which is visualized in the current slice image, can change the size and position of the cuboid. In the case of the availability of a multi-touch screen, gestures can be used to change the geometric primitives through simultaneous use of multiple fingers.

The identification and labelling of the segmented cells can be helpful during the planning process and especially during the intervention when the segmented cell are visualized in different views. The following possibilities may be used to identify the cells (but not limited to):
Selecting predefined labels prior to segmentation based on anatomical list.
Selecting predefined labels or entering custom labels during or after segmentation
Automatic assignment of predefined labels based on anatomical Atlas
Automatic assignment of predefined labels based on the order of segmentation
Automatic assignment of predefined labels based on the spatial relation of the objects to each other.
Some implementations of the invention may not require the identification to derive sufficient quality results Based on the manually segmented and potentially identified geometric primitives, the data values of the 3-D image data are analysed inside the selected geometric primitive and its vicinity with the aim to calculate the correct anatomical shape of the cell and derive additional relevant properties such as (but not limited to): filling, disease status, volume, drainage pathway, entry point or exit point. For each 3-D image element (voxel) it has to be decided whether the voxel belongs a.) completely to the cell, b.) not at all to the cell, c.) partially to the cell with a given subdivision boundary. The differentiation of the cell interior from the rest within the area defined by geometric primitive and its surrounding can be implemented as follows (but not limited to):
The assignment bases only on the data value of the 3-D image element, the determination of the threshold can be selected automatically e.g. by the method of Otsu (Otsu, N., 1979, IEEE Transactions on Systems, Man and Cybernetics, 9(1), 62-66) or manually by the user 3-D region growing with one or more seed points which are automatically or manually selected
Adaptive segmentation methods such as (Pappas, 1992, Transactions on Signal Processing, 40(4))
Analysis of the gradients in a 3-D data set starting from the centre of the geometric primitive.

Figure 6:
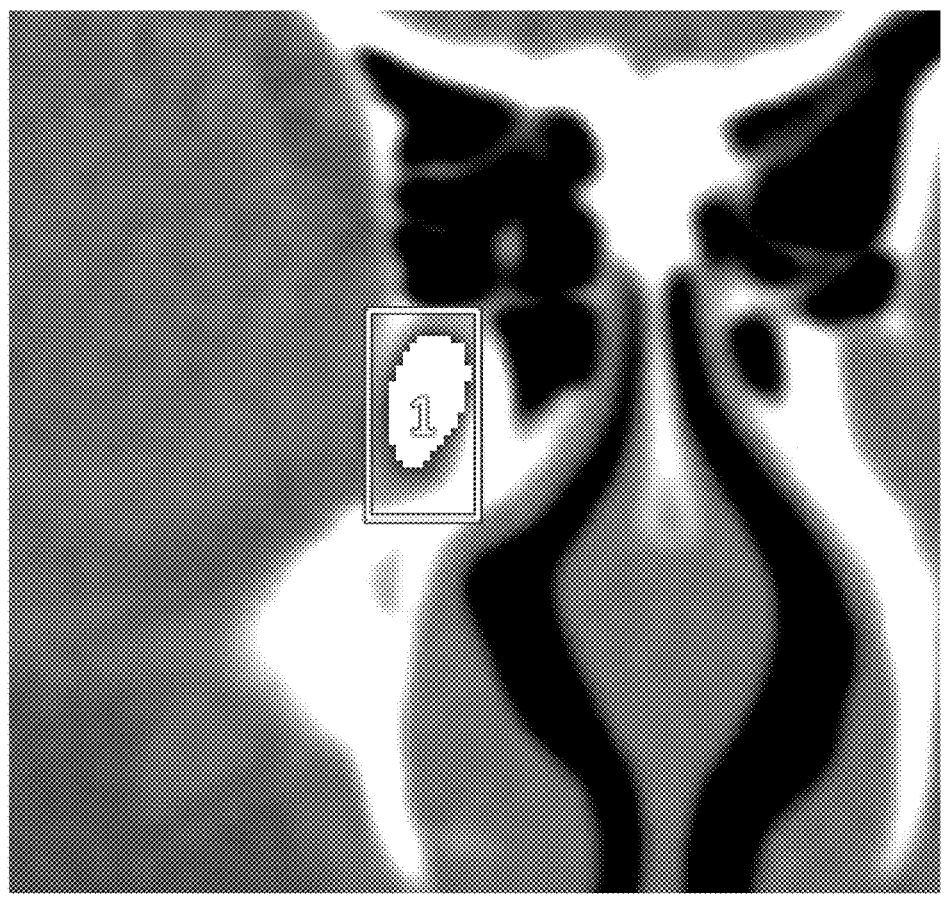
Figure 8:
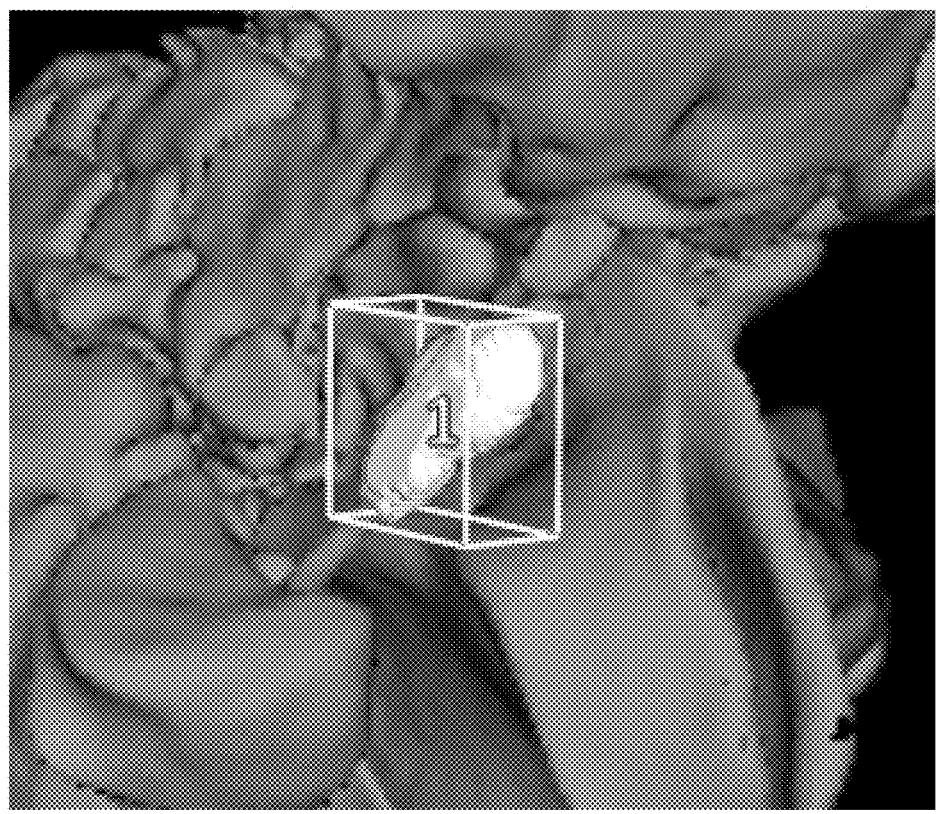

Based on the results of the analysis of the contents of manually segmented geometric primitives, the segmentation and thus the visualization of the cell envelope can be adjusted. The implementation can be realized in one of the following ways:
  a. The envelope is calculated based on the automatically segmented cell anatomy. The cell envelope can be generated for example as a triangle mesh which encloses the voxels corresponding to the cell using the marching cubes method (Lorensen & Cline, 1987, Proceedings of the 14th annual conference on Computer graphics and interactive techniques (pp. 163-169). FIGS. 6 and 8 show the adjusted segmentation of the cell according to the anatomy of the patient within a previously manually defined cuboid in a slice image and a 3D view.
  b. Adjustment of the manually defined geometric shape based on the results of the evaluation of the 3D image data. Here one can proceed as follows:
    i. Selection of the type of geometric primitive may automatically based on the initial segmentation, the cell identification, the associated label, user input or the anatomical shape of the cell.
    ii. Optimization of the position, orientation and size of the geometric primitive such that the geometric shape describes as good as possible the correct anatomical shape of the cell. In case of a sphere, one solution can be to determine the smallest enclosing sphere which encloses all voxels corresponding to the cell. The determination of the position and size of the sphere uses optimization methods which minimizes the radius under the constraint $(c_x-x_i)^2+(c_y-y_i)^2+(c_z-z_i)^2 \leq r^2$,
    where $c_x$, $c_y$, $c_z$ denote the coordinates the sphere centre point, and $x_i$, $y_i$, $z_i$ denotes the centre point of the i-th voxel which is a part of the anatomical cell segmentation.
    Another approach to the determination of the sphere is the positioning the sphere in the centre of all voxels belonging to the cell. The radius of the sphere can then be computed such that the volume of the anatomical cell is equivalent to the volume of the sphere.
    Both of these approaches, the optimization of the ball as the complete envelope of the cell or as a sphere having the same volume as the cell, can be implemented as well for other geometric primitives. In these cases further constraints can be defined e.g. on the orientation of the primitives, so that only the position and size are allowed to be changed in comparison to the result of the manual pre-segmentation step or the orientation of the geometric primitive corresponds to a given reference coordinate system.

In addition to the shape, position and size of a cell in the sinuses, the location of the ostium is an important information for the surgeon during the planning and performing a surgical intervention.

The segmentation of the natural drainage pathway of a nasal cell can be performed by manual marking multiple points in the slice images of the 3D image data, which can be connected according to the order of marking or according to their location.

Alternatively, the results of the performed cell segmentation can be used to automatically determine the location of the natural drainage pathway. For this purpose, it is possible to determine either the optimal or shortest path to adjacent already segmented cells. Here, well-known pathfinding algorithms may be used which interpret the 3D image data as a graph. The gray values or gray value changes in the 3-D image data are used to calculate the cost between the nodes of the graph.

If in addition the main nasal cavity with connected sinuses is automatically segmented e.g. by means of 3D region growing, the natural drainage pathway of a segmented cell to the main nasal cavity can also be determined. Here, pathfinding algorithms, such as the A* algorithm, can be used, too.

The presentation of the natural drainage pathway of a cell can be realized in the slice images, in the 3-D view, in a virtual endoscopic view or in an endoscopic augmented reality view as either (but not limited to):
  linked line segments
  splines
  linked, possibly curved cylindrical segments
  meshes
  voxels For surgical planning, it is often important for the user to know parameters and properties of the segmented cell to perform the treatment optimally. These parameters can include the width, height, depth and volume of the adjusted cell envelope, which can be displayed to the user. In addition, it is possible to deduce from the gray values of the 3D image data, whether the cell is filled with air or fluid or tissue. Hence, an automatic assignment to the health of the cell can be met. Also the shape and diameter of the natural drainage pathway can be analysed based on the 3D image data in order to identify problem regions in the anatomy of the patient and to highlight the visualization of the cell if necessary.

Figure 5:
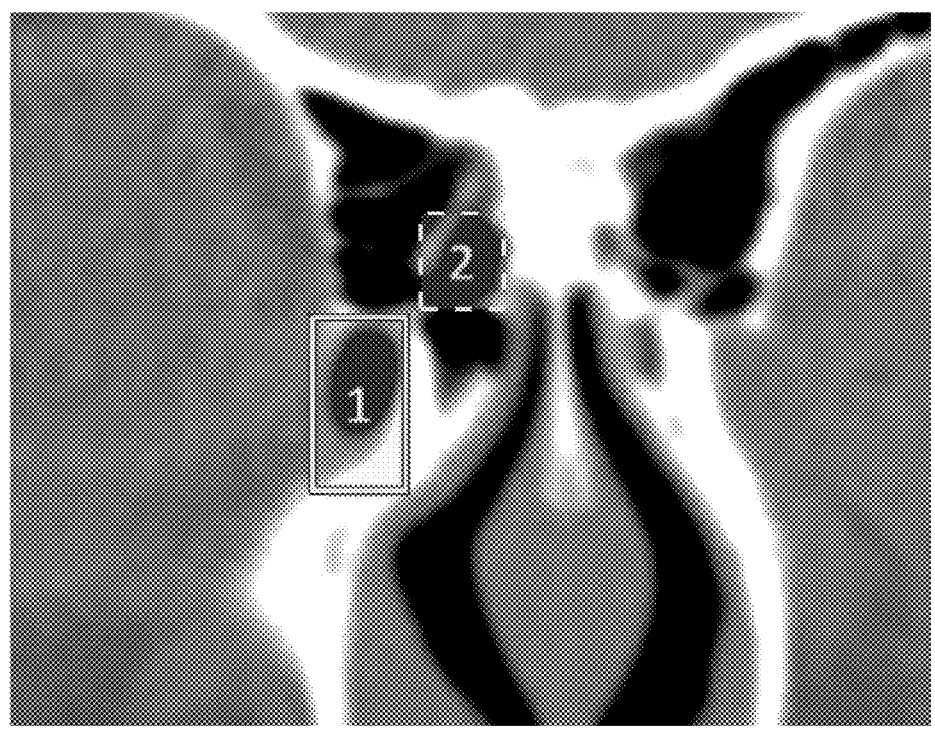

Based on the results of individual cell analysis, a global cell analysis and inter-space analysis can be conducted to adjust cell properties based on individual and global analysis results. The following analysis steps are possible (not limited to):
  Linkage between cells based on shortest path, connectivity, anatomical aspects
  identification of additional inter-space cells
  size correction of cells
  Calculation of recommended surgical pathway
  identification of anatomical aberrations, pathologies
  Identification of critical anatomical sites such as nerves, blood vessels Based on the identified properties additional visualization marks may be added as follows (but not limited to):
  Entry and exit locations into neighbouring cells may be visualized
  The pathways between entry and exit as trajectories
  The disease status and filling with additional symbols and colours
  Volume size as textual output
  Identification label as textual output
  Addition of audiovisual warning labels and sound for alarm regions The visualisation in slice images comprises:
Sectional illustration of the pre-segmented geometric primitives and/or the adjusted cell envelope in the plane of the slice image. The display can show the boundaries of the geometric primitive and/or the cell envelope (as shown in FIG. 5) or its sectional area is marked opaque or semi-transparent (FIG. 6)
Display of labels for cell identification (this can be textual information or numbers, symbols are also possible)
Highlighting the currently selected cell (e.g. by using a solid line to show the currently selected cell while all cells are displayed with dashed lines, alternatively the colour, line width or opacity can be changed to highlight the currently selected cell)
Display of the defined natural drainage pathways as a intersection of the path with the plane of the slice image in form of a point or highlighted area The visualization in a 3D view comprises:
Perspective or orthographic representation of the geometric primitives and/or the adjusted cell envelope in a 3D view of the nasal cavities
Display of labels to identify the cells (this can be textual information or numbers, symbols are also possible)
Display of the segmented natural drainage pathways as linked line segments, splines or linked, possibly curved cylindrical segments
By hiding the surface of the 3D image data, the relative position of the segmented cells to one another can be conceived well by user.

The virtual endoscopic view is comparable to the 3D view showing the segmentation in the 3D image data, but it simulates the imaging of the surgical field through an endoscope optics. In comparison to the 3D view, the appearance of the surfaces of the 3D image data and the camera perspective properties are adjusted to correspond to normal endoscopic imaging.

During the intervention, the imaging properties of the camera can also use the parameters of the camera model of the currently used endoscope which were estimated during an intra-operative endoscope calibration process. This enables the display of the real the corresponding virtual endoscopic image side by side. This allows the surgeon to transfer mentally the visualised segmentation from the virtual to the real endoscopic image.

In the augmented reality view, the segmentations are displayed as an superimposition on the images of a real camera system, such as the endoscope. For this purpose, it is necessary to know accurately the imaging properties of the camera system to achieve the marking of the segmentation at the correct position in the real endoscopic image.

During the intervention, the results of the nasal cell segmentation can be used by surgical navigation systems to show the distance between the tool centre point of the currently navigated tool and the nearest point on the envelope of the segmented cells or the natural drainage pathway. The distance can be displayed in text in a separate user interaction widget or as a textual overlay in the augmented reality view or the virtual endoscopic view.

The novelty of the invention is to firstly perform a manual pre-segmentation for the coarse localization of the cells in the slice images of the 3D image data of the patient. The results of the pre-segmentation are then optimized regarding shape, position, orientation and size image data by evaluating the 3D image data of the patient. This allows a reliable and computer-aided segmentation and surgery planning especially in cases of pathological anatomy of the paranasal sinuses.

The advantages of the invention are:
a. Easy user interaction for manual segmentation of cells in 3D image data by geometric primitives
b. Automatic optimization of manual segmentation based on 3D image data usually without any further user interaction
c. Automated detection of the natural drainage pathways on the basis of previous cell segmentation and the 3D image data of the patient
d. Intuitive visualization of segmentation during the surgical planning and during the intervention

DETAILED DESCRIPTION OF THE FIGURES

Figure 1:
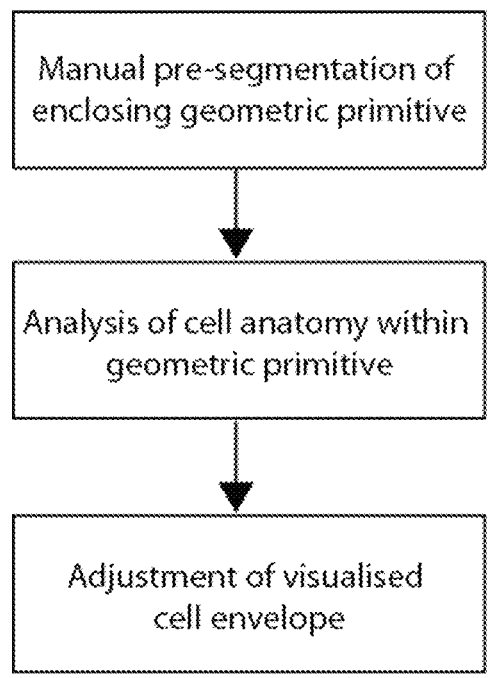
FIG. 1 Main steps of segmentation method of one cell in the paranasal sinuses

FIG. 1 discloses the main steps to segment one cell of the nasal cavities in the 3D image data of the patient. The first step includes a manual marking of the cell with the help of geometric primitives in the slice images of the 3D image data. These primitives can have shapes such as cuboids, cylinders, spheres or ellipsoids. Based on the results of this manual segmentation step, an automated analysis of the cell anatomy is then conducted within or in the vicinity of the selected primitives. During this analysis, the actual anatomy is calculated based on the 3D image data. For that purpose, the property of cell affiliation is assigned to each voxel. It thus specifies whether the voxel is part of the cell, not part of the cell or, if applicable, partially belongs to the cell. The third visualised step includes the adjustment of the cell envelope which is presented to the user during planning and the surgical intervention. Here, for example, the cell envelope can be derived from the results of the automated analysis by generating a triangle mesh using the marching cubes algorithm. Alternatively, the cell can be described and visualised by a geometric primitive, which is optimized in position, orientation and/or size.

FIG. 2 discloses a window element (widget) for user interaction, in which the anatomical label and the type of geometric primitive for cell segmentation can be specified by the user during the first process step of manual segmentation. The widget comprises a list view with entries of names of anatomical cells in the paranasal sinuses and the corresponding type of geometric primitives that will be used for manual segmentation. The type of geometric primitives can, for example, be selected and changed by a computer mouse interaction. The type of geometric primitive per cell is initially pre-selected e.g. based on the last selection of the user or the suitability for the anatomical shape with healthy anatomy or the instructions and suggestions from the literature.

FIG. 3 discloses a dialog box for assigning manually textual labels and colours to individual cell segmentations at the beginning, during or after the manual pre-segmentation of the cell in the slice images of the 3D image data of the patient. Die dialog box in the figure includes a textbox which outputs the current label of the cell and which can change the label depending on the input of a keyboard or screen keyboard. Alternatively, the recorded voice of the user can be analysed and converted to textual labels of the cell. In addition, the user can choose from various colours for the representation of the cell that are displayed in the form of rectangular faces. By clicking on a coloured face, the corresponding colour can be selected.

Figure 4:
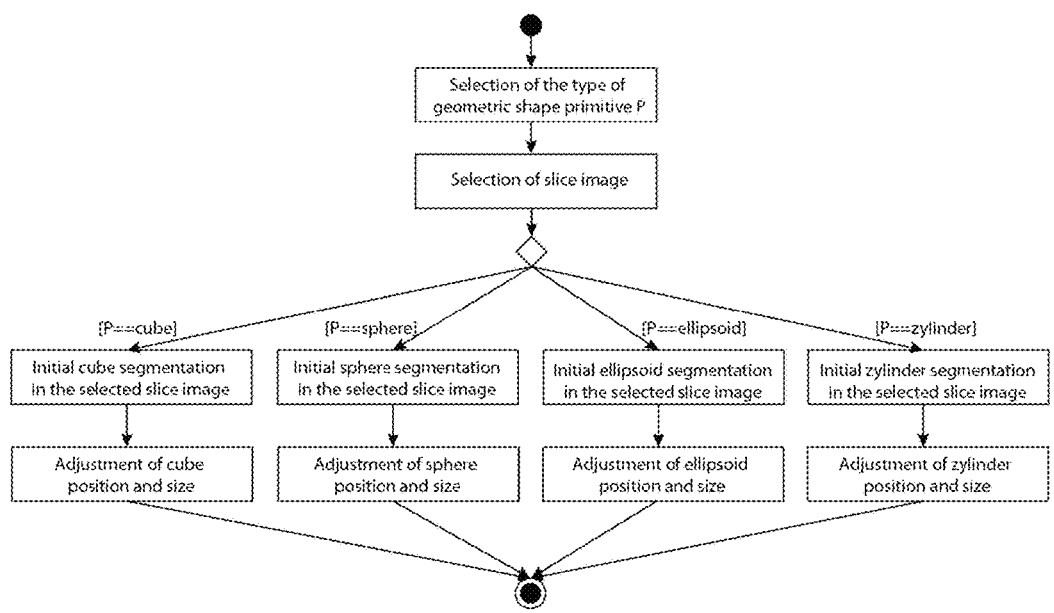

FIG. 4 discloses a possible sequence of the manual segmentation of a cell in the slice images of 3D image data of the patient. The sequence starts with the selection of the type of the geometric primitive. A possible realisation of this selection is shown in FIG. 1. The following step is the selection and display of the slice image of the 3D image data in which the initial segmentation of the geometric primitive is to be performed. The order of these first two steps, however, is interchangeable, since the selections of the type of geometric primitives and the slice image can be performed independently. Then, an initial segmentation is conducted in the selected slice image of the 3D image data depending on the selected type of geometric primitives. Subsequently, the user can change the orientation and position of the selected and displayed slice image in order to change the position and size of the geometric primitive in that newly selected slice image. In the case of selection of a cuboid, an ellipsoid or a cylinder, it makes sense to limit the orientation of the slice images to the same or an orthogonal orientation for the manual adjustments of the geometric primitive.

FIG. 5 discloses a possible visualisation of pre-segmented cuboids in a slice view of the 3D image data of the patient. The visualisation of the cuboids is done by marking the contour of the section of the plane of the slice image with the segmented cuboid. The cuboid with the mark 1 is selected for further processing and is therefore shown highlighted. For better differentiation of bright-rendered contour line and the content of the section image, an additional surrounding shadow is drawn around the contour line. The other cuboid is not selected and is therefore drawn in reduced or not highlighted form with a dashed line. In addition to displaying the slice contour of the cuboid, label are displayed which were assigned to the cells.

FIG. 6 discloses a possible visualization of the result of the manual pre-segmentation in combination with the result of adjustment of the cell envelope in a slice view of the 3D image data of the patient. During the pre-segmentation of the cell, a cuboid was defined which is visualised in the form of a sectional contour of the cuboid with of the plane of the current slice image. In addition, the newly adjusted cell envelope is visualised which is calculated based on the automatically segmented cell anatomy. This is visualised exemplarily not only in form of the section contour rather than in form of the opaque sectional area. In addition, the label of the cell is displayed.

Figure 7:
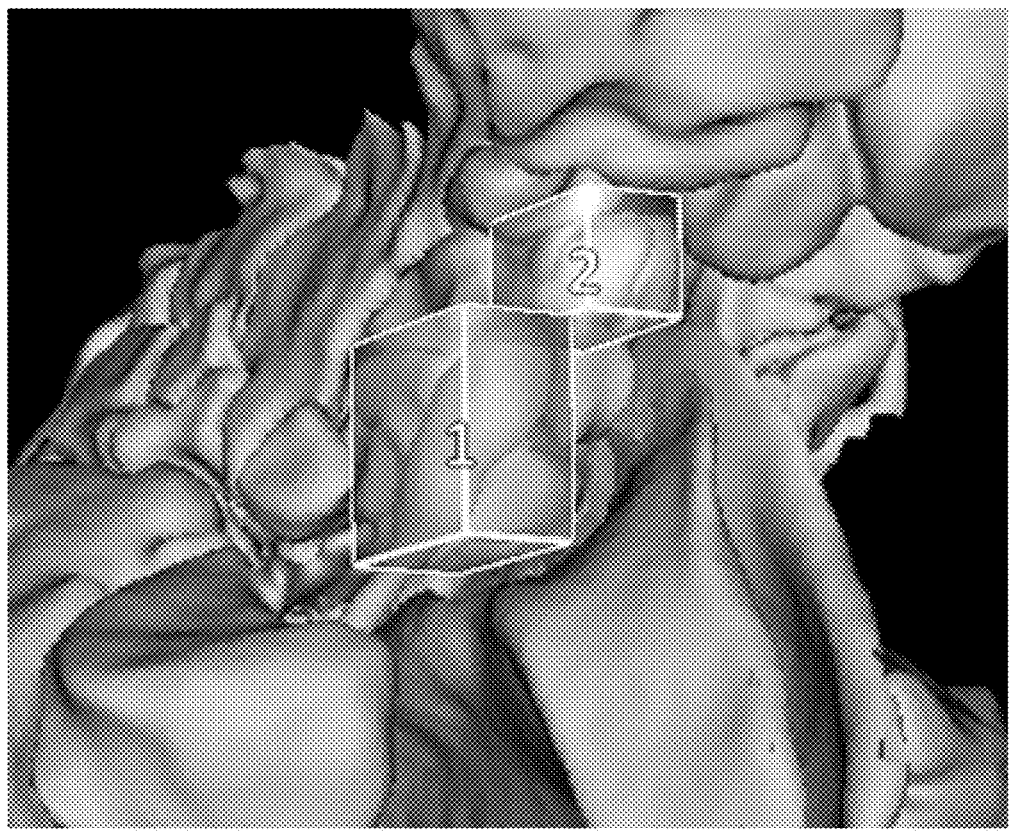

FIG. 7 discloses a possible visualization of the results of the pre-segmentation in a 3D view of the nasal cavities based on the 3D image data of the patient. In this view, the cavities of the nose are shown as shaded solid objects. In addition, the segmented cuboids are visualized. The edges of the cuboids are highlighted as bright line and the faces are rendered semi-transparent. In addition, the labels of the cells are displayed.

FIG. 8 discloses a possible visualization of the result of the manual pre-segmentation in combination with the result of adjustment of the cell envelope in a 3D view of the nasal cavities based on the 3D image data of the patient. In this view, the cavities of the nose are shown as shaded solid objects. In addition, the pre-segmented cuboids are visualized. The edges of the cuboids are highlighted as bright line and the faces are not rendered. In addition, the newly adjusted cell envelope is visualised which is calculated based on the automatically segmented cell anatomy. This is visualised exemplarily in form of the shaded opaque solid object. In addition, the label of the cell is displayed.

Figure 9:
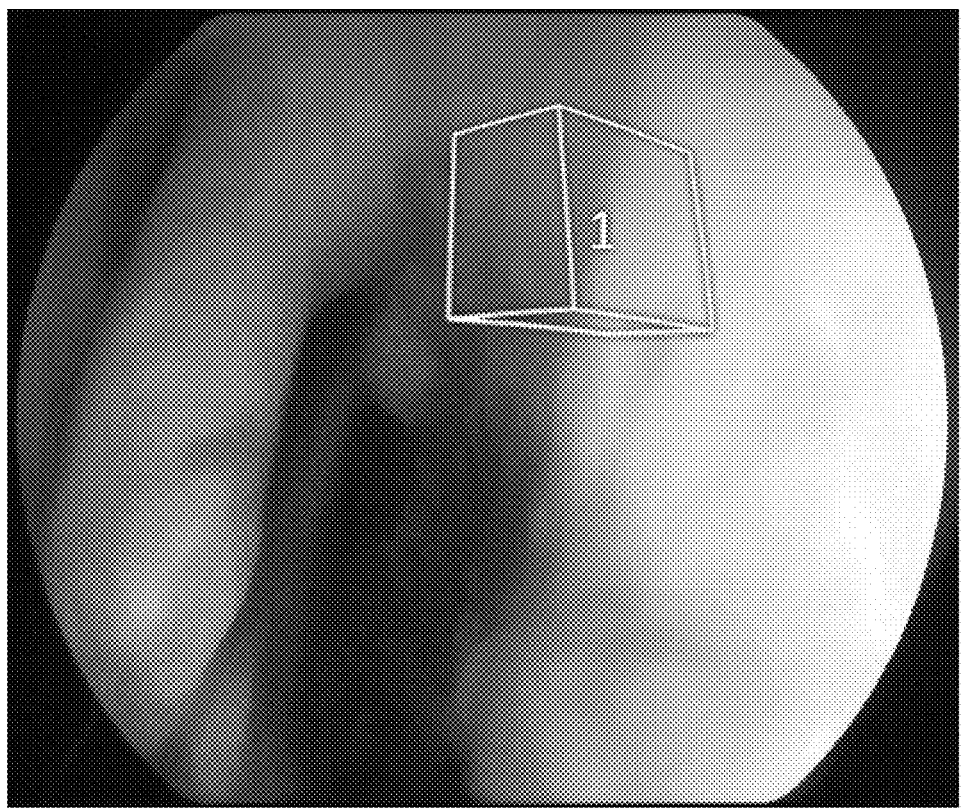

FIG. 9 discloses a possible visualisation of a segmented geometric primitive during a surgical procedure as a superimposition in the current endoscope image. The figure shows an endoscopic camera image that is usually displayed on a monitor during the procedure. In addition, the geometric primitive is marked in the camera image at the correct position in correct perspective. The edges of the cuboid are highlighted light-coloured. The faces are not rendered in order to hide as little as possible of the original contents of the endoscope image.

The invention claimed is:

1. A method for a user to generate a reliable computer-aided segmentation and visualization of a plurality of cells of the paranasal sinuses for guiding a surgical instrument wherein the method is at least partially executed on an information processing system, said method comprising the steps of:
   a. receiving 3D patient image data of the paranasal sinuses;
   b. receiving a manual pre-segmentation of the plurality of cells, the manual pre-segmentation of cells comprising a user input defining a geometric primitive in a slice image of the 3D patient image data for generating a cell envelope, the geometric primitive comprising a shape selected from a group comprising a cuboid, sphere, cylinder and ellipse and each having a position, size, and depth defined by the user;
   c. adjusting the cell envelope by optimizing the shape, position, orientation, and/or size of the geometric primitive based on an analysis of a cell anatomy within the pre-segmented geometric primitive without additional input from the user;
   d. determining, by the information processing system, a natural drainage pathway between, along, and/or around the plurality of segmented cells using pathfinding algorithms based on the 3D patient image data;
   e. displaying the cell envelope and the natural drainage pathway relative to the 3D patient image data; and
   f. displaying the natural drainage pathway as linked cylindrical segments in augmented reality views.

2. The method of claim 1, wherein the step of determining the natural drainage pathway between the plurality of segmented cells further comprises conducting a global cell analysis, wherein the global cell analysis is configured to identify anatomical aberrations or pathologies.

3. The method of claim 1, wherein the step of determining the natural drainage pathway between the plurality of segmented cells further comprises conducting a global cell analysis, wherein the global cell analysis is configured to identify critical anatomical sites such as nerves and/or blood vessels.

4. The method of claim 1, wherein the step of determining the natural drainage pathway between the plurality of segmented cells further comprises conducting a global cell analysis, wherein the global cell analysis is configured to determine a cell linkage based on shortest path, connectivity, or anatomical aspects.

5. The method of claim 4, wherein the determined cell linkage are visualized as entry and exit locations into neighboring cells or at least one surgical pathway is visualized as a trajectory between an entry and exit location of the plurality of segmented cells.

6. The method of claim 1, wherein properties of the plurality of cells are determined and displayed to the user including the cell volume, filling, disease status, drainage pathway and orifices.

7. The method of claim 1, further comprising communicating the determined natural drainage pathway to the surgical navigation system configured to navigate the surgical instrument based on the determined natural drainage pathway.

8. The method of claim 1, further comprising the step of labelling of the segmented cells based on receiving a manual input or automatic detection by said system.

9. The method of claim 1, wherein the step of determining the natural drainage pathway between the plurality of segmented cells further comprises conducting a global cell analysis, wherein the global cell analysis is configured to identify additional inter-space cells.

10. A method for a user to generate a reliable computer-aided segmentation and visualization of a plurality of cells of the paranasal sinuses for guiding a surgical instrument wherein the method is at least partially executed on an information processing system, said method comprising the steps of:
   a. receiving 3D patient image data of the paranasal sinuses;
   b. receiving a manual pre-segmentation of the plurality of cells, the manual pre-segmentation of cells comprising a user input defining a geometric primitive in a slice image of the 3D patient image data for generating a cell envelope, the geometric primitive comprising a shape selected from a group comprising a cuboid, sphere, cylinder and ellipse and each having a position, size, and depth defined by the user;
   c. adjusting the cell envelope by optimizing the shape, position, orientation, and/or size of the geometric primitive based on an analysis of a cell anatomy within the pre-segmented geometric primitive without additional input from the user;
   d. determining, by the information processing system, a natural drainage pathway between, along, and/or around segmented cells using pathfinding algorithms based on the 3D patient image data;
   e. displaying the cell envelope and the natural drainage pathway relative to the 3D patient image data; and
   wherein the adjusted cell envelope or the determined natural drainage pathway are displayed pre- or intra-operatively in a virtual endoscopic view or intra-operatively in an augmented-reality-view.

11. A method for a user to generate a reliable computer-aided segmentation and visualization of a plurality of cells of the paranasal sinuses for guiding a surgical instrument wherein the method is at least partially executed on an information processing system, said method comprising the steps of:
   a. receiving 3D patient image data of the paranasal sinuses;
   b. receiving a manual pre-segmentation of the plurality of cells, the manual pre-segmentation of cells comprising a user input defining a geometric primitive in a slice image of the 3D patient image data for generating a cell envelope, the geometric primitive comprising a shape selected from a group comprising a cuboid, sphere, cylinder and ellipse and each having a position, size, and depth defined by the user;
   c. adjusting the cell envelope by optimizing the shape, position, orientation, and/or size of the geometric primitive based on an analysis of a cell anatomy within the pre-segmented geometric primitive without additional input from the user;
   d. determining, by the information processing system, a natural drainage pathway between, along, and/or around segmented cells using pathfinding algorithms based on the 3D patient image data;
   e. displaying the determined natural drainage pathway relative to the 3D patient image data; and
   wherein the step of displaying further comprises presenting the determined natural drainage pathway in a plurality of slice images, in a 3D view, in a virtual endoscopic view, or in an endoscopic augmented reality view as either:
   linked line segments,
   splines,
   inked curved cylindrical segments,
   meshes, or
   voxels.

12. The method of claim 11, wherein the step of displaying comprises presenting the determined natural drainage pathway in the plurality of slice images, wherein each of the slice images comprises a sectional illustration of the pre-segmented geometric primitive and/or the adjusted cell envelope in the plane of an individual slice image of the plurality of slice images, wherein the sectional illustration comprises the boundaries of the geometric primitive and/or the cell envelope or its sectional area marked opaque or semi-transparent.

13. The method of claim 11, wherein the step of displaying comprises presenting the determined natural drainage pathway in the plurality of slice images, wherein each of the slice images comprises highlighting of a currently selected cell by using a different line-type, color, line width, or opacity to show the currently selected cell relative to other cells.

14. The method of claim 11, wherein the step of displaying comprises presenting the determined natural drainage pathway in the plurality of slice images, wherein each of the slice images comprises displaying the determined natural drainage pathway as an intersection of the determined natural drainage pathway with the plane of each of the slice images in the form of a point or highlighted area.

15. The method of claim 11, wherein the step of displaying further comprises presenting the determined natural drainage pathway in the 3D view, wherein the 3D view comprises:
   displaying a perspective or orthographic representation of the geometric primitive and/or the adjusted cell envelope in a 3D view of the nasal cavities;
   displaying of labels to identify the cells, wherein the labels comprise textual information, numbers, or symbols; or
   hiding a surface of the 3D image data to allow the relative position of the plurality of segmented cells to one another to be visualized by the user.

16. The method of claim 11, wherein the step of displaying comprises presenting the determined natural drainage pathway in a plurality of slice images, in a 3D view, in a virtual endoscopic view, or in an endoscopic augmented reality view as linked line segments.

17. The method of claim 11, wherein the step of displaying comprises presenting the determined natural drainage pathway in a plurality of slice images, in a 3D view, in a virtual endoscopic view, or in an endoscopic augmented reality view as splines.

18. The method of claim 11, wherein the step of displaying comprises presenting the determined natural drainage pathway in a plurality of slice images, in a 3D view, in a virtual endoscopic view, or in an endoscopic augmented reality view as linked curved cylindrical segments.

19. The method of claim 11, wherein the step of displaying comprises presenting the determined natural drainage pathway in a plurality of slice images, in a 3D view, in a virtual endoscopic view, or in an endoscopic augmented reality view as meshes.

20. The method of claim 11, wherein the step of displaying comprises presenting the determined natural drainage pathway in a plurality of slice images, in a 3D view, in a virtual endoscopic view, or in an endoscopic augmented reality view as voxels.

* * * * *